(12) United States Patent
Palanisamy et al.

(10) Patent No.: US 11,652,632 B2
(45) Date of Patent: May 16, 2023

(54) CONTEXTUAL AUTOMATED DEVICE ONBOARDING

(71) Applicant: VMWARE, INC., Palo Alto, CA (US)

(72) Inventors: Karthikeyan Palanisamy, Bangalore (IN); Arvind Maan, Bangalore (IN); Ashok Kumar, Bangalore (IN); Amit Kumar Singh, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 257 days.

(21) Appl. No.: 16/914,259

(22) Filed: Jun. 26, 2020

(65) Prior Publication Data

US 2021/0351929 A1 Nov. 11, 2021

(30) Foreign Application Priority Data

May 7, 2020 (IN) .............................. 202041019439

(51) Int. Cl.
*H04L 9/32* (2006.01)
*G06K 7/14* (2006.01)

(52) U.S. Cl.
CPC .......... *H04L 9/3213* (2013.01); *G06K 7/1417* (2013.01)

(58) Field of Classification Search
CPC ... H04L 63/104; H04L 9/3213; G06K 7/1417; G06F 21/33; G06F 2221/2117
See application file for complete search history.

(56) References Cited

U.S. PATENT DOCUMENTS

| | | | | |
|---|---|---|---|---|
| 9,361,521 B1* | 6/2016 | McLean | ........... | G08B 13/19645 |
| 10,929,147 B1* | 2/2021 | Pell | ........ | H04L 9/0866 |
| 11,522,702 B1* | 12/2022 | Panchapakesan | ..... | H04L 9/3213 |
| 2013/0305056 A1* | 11/2013 | Johnson | ................ | H04L 63/06 |
| | | | | 713/186 |
| 2014/0164243 A1* | 6/2014 | Aabye | .................... | G06Q 20/20 |
| | | | | 705/44 |
| 2016/0188307 A1* | 6/2016 | Reagan | ................... | H04L 67/32 |
| | | | | 717/177 |
| 2017/0093766 A1* | 3/2017 | Nagaralu | ............. | G06Q 10/107 |
| 2017/0346692 A1* | 11/2017 | Haapanen | ............... | H04L 63/08 |
| 2019/0139440 A1* | 5/2019 | Saito | ..................... | G06Q 40/08 |
| 2019/0141919 A1* | 5/2019 | Kundra | ................ | G06V 20/188 |
| | | | | 348/159 |
| 2020/0127953 A1* | 4/2020 | Maddipati | ............. | H04L 67/535 |
| 2020/0274873 A1* | 8/2020 | Guionneau | ............... | H04L 9/14 |
| 2020/0327526 A1* | 10/2020 | Rogers | ................ | G06Q 20/206 |
| 2020/0358754 A1* | 11/2020 | Nair | ..................... | H04L 63/102 |
| 2021/0311710 A1* | 10/2021 | Aun | ........................ | G06F 9/542 |

* cited by examiner

*Primary Examiner* — Mohammad A Siddiqi
(74) *Attorney, Agent, or Firm* — Clayton, McKay & Bailey, PC

(57) ABSTRACT

Examples described herein include systems and methods for contextually providing automated device enrollment into a management system. A management application on a user device can receive network settings for connecting to a local server. The network settings can be preconfigured by an administrator. The management application can cause the user device to send an enrollment request and a device identifier to the local server. The device identifier can be used to validate the device and provide a security token to the management application. The management application can use the security token to complete enrollment of the user device.

20 Claims, 4 Drawing Sheets

CONTEXTUAL AUTOMATED DEVICE ONBOARDING

RELATED APPLICATIONS

Benefit is claimed under 35 U.S.C. 119(a)-(d) to Foreign application Serial No. 202041019439 filed in India entitled "CONTEXTUAL AUTOMATED DEVICE ONBOARDING", on May 7, 2020, by VMware, Inc., which is herein incorporated in its entirety by reference for all purposes.

BACKGROUND

Enterprises increasingly rely on management systems—such as a Unified Endpoint Management System ("UEMS")—to manage the mobile devices of their employees. These systems can competently manage both enterprise-owned and user-owner devices. But in order to manage a device, that device must first be enrolled with the management system. The enrollment process can be inefficient, leading to productivity losses or even discouraging employees from enrolling at all.

One example inefficiency of some management systems is the need for user intervention, such as entering credentials. In some instances, a user will only enroll one device and be discouraged from enrolling their other devices based on lost time. Additionally, administrators may need to perform repetitive onboarding tasks for multiple devices with similar enrollment requirements. For example, organizations at times need to enroll a large volume of devices at one time. This requires that a user or administrator enter credentials on all the devices, which is a cumbersome and time-consuming process. The tasks involved are repetitive and time consuming. Even with staged user configuration, users must still enter their credentials in order to receive additional onboarding assignments. No seamless end-to-end solution exists for onboarding user devices into a UEMS.

As a result, a need exists for improved methods and systems of seamlessly enrolling device into a UEMS. More specifically, a need exists for onboarding devices into a UEMS using minimal user intervention.

SUMMARY

Examples described herein include systems and methods for contextually providing automated device enrollment into a management system. In one example, the method can include a management application of a user device receiving network settings for connecting to a local server. In an example, the network settings can be preconfigured by an administrator.

The method can also include the management application sending an enrollment request and a device identifier to the local server. The local server can connect to a management server for a UEMS and then forward the enrollment request and device identifier. In an example, the local server can also send a group identifier associated with the location of the local server. The management server can validate that the user device is authorized to enroll. In one example, the management server can also generate or retrieve a security token for the user device to use to complete enrollment.

In an example of the method, the management server can notify the local server that the user device is authorized to enroll. The local server can send enrollment instructions to the user device. The enrollment instructions can include a network address for the management server, for example. Some examples of the method can include the local server also sending a security key or credentials for the user device to complete enrollment. Other examples can include the local server sending an enrollment template with placeholders to the user device. The management application can fill the placeholders with information types indicated by the placeholders. The placeholders can help the management server uniquely identify and authenticate the user device. For example, the placeholders can require identifying information in the username and/or password. Some examples of identifying information can include the model and serial number or International Mobile Equipment Identity of the user device. The enrollment template can also include, for example, a group identifier that identifies an organizational group to associate with the user device.

The method can include the user device completing enrollment by sending the security token or credentials to the management server. In examples where the user device authenticates with a security token, the user device can use a different security key to encrypt the token it sends to the management server than the key used to unencrypt the received token.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for contextually providing automated device enrollment into a management system. A management application on a user device can receive network settings for connecting to a local server. The network settings can be preconfigured by an administrator. The management application can cause the user device to send an enrollment request and a device identifier for the user device to the local server. The device identifier can be used to validate the device and provide a security token to the management application. The management application can use the security token to complete enrollment of the user device.

Figure 1:
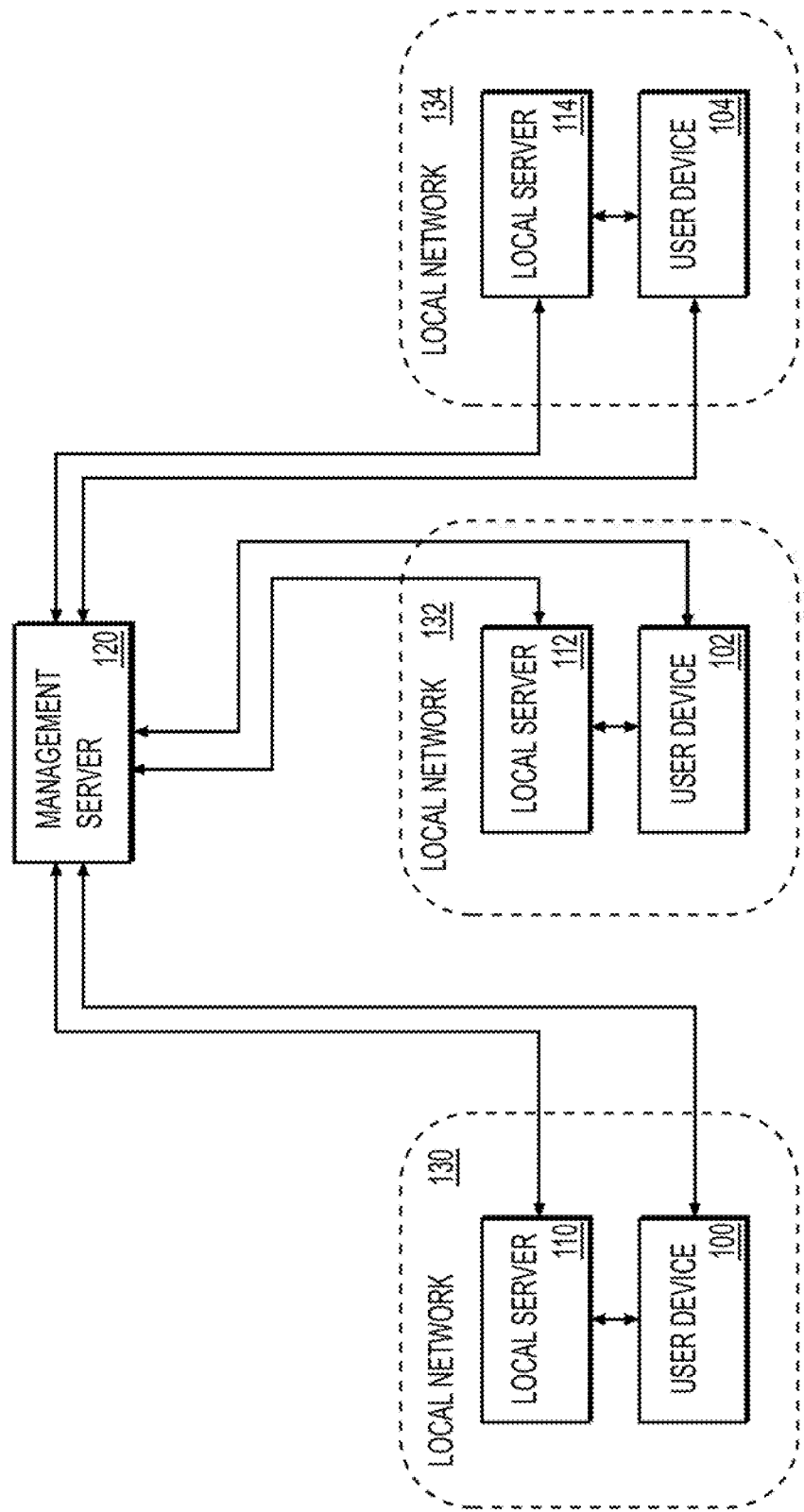
FIG. 1 is an illustration of an example system for contextually providing automated device enrollment into a management system.

FIG. 1 is an illustration of a system for performing contextualized dynamic onboarding. The example system can include a management server 120 and a local network 130. The local network 130 can include a user device 100 and a local server 110, and the user device 100 can include a management application 140. The system can also include other local networks that also have a local server and a user device. For example, the system can include local network 132 that has local server 112 and user device 102, and local network 134 that has local server 112 and user device 104. In some examples, local networks 132 and 134, and their corresponding local servers and user devices, can be merely duplications of the local network 130 with the local server 110 and the user device 100. For example, an enterprise may have multiple locations, such as offices or stores, where users may enroll their devices. Each location can have its own local network and server whereby users can enroll a user device using the methods described herein. Accordingly, discussions herein relating to the local network 130, the local server 110, and the user device 100 can also apply to the corresponding components at the other "locations."

The management server 120 can be a single server or a group of servers, including multiple servers implemented virtually across multiple computing platforms. In one example, the management server 120 can be a server within an enterprise network. In another example, the management server 120 can handle the enrollment of user devices. Enrollment can include installing managed applications and other resources on a user device.

The user device 100 can be one or more processor-based devices, such as a personal computer, tablet, or cell phone. The user device 100 can have a management application 140 installed thereon. The management application 140 can be a stand-alone application, part of an enterprise application, or part of an operating system of the user device 100. The management application 140 can be part of an enterprise Unified Endpoint Management system ("UEMS") that manages and secures user devices that are enrolled with the enterprise. For example, the management application 140 can be responsible for ensuring that user devices are up to date with compliance and security settings prior to accessing UEMS data and resources. The management application 140 can communicate with the management server 120, allowing UEMS management of user devices 100 based on compliance and security settings at the management server 120. The management application 140 can enforce compliance at the user device 100, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The local server 110 can be a single server or a group of servers, including multiple servers implemented virtually across multiple computing platforms. The local server can be located within the local network 130 and able to communicate with the management server 120. For example, the management server 120 can be located within an enterprise network, and the local server 110 can be located within local network 130 that is outside the enterprise network. As some examples, the local network 130 and local server 110 can be located at a local office or store of an organization.

In one example, different stores or offices can include different local networks 130, 132, 134 and different local servers 110, 112, 114. As will be described later, local servers 110, 112, 114, can provide enrollment information to the user devices 100, 102, and 104 that allow them to complete enrollment. The enrollment information can vary depending on location. For example, the enrollment information an include an identifier that indicates the location where the user device 100 is enrolling or an organization to which the user device 100 belongs, as some examples. In some examples, the identifier from the different local servers 110, 112, 114 can correspond to different tenants in the UEMS. Alternatively, the enrollment instructions can include a payload with a tenant identifier. The management server 120 can use the tenant identifier to validate the enrollment and associate a user device 100, 102, 104 with the correct tenant in the UEM, in an example. Tenants can correspond to different enterprises or groups within an enterprise.

Figure 2:
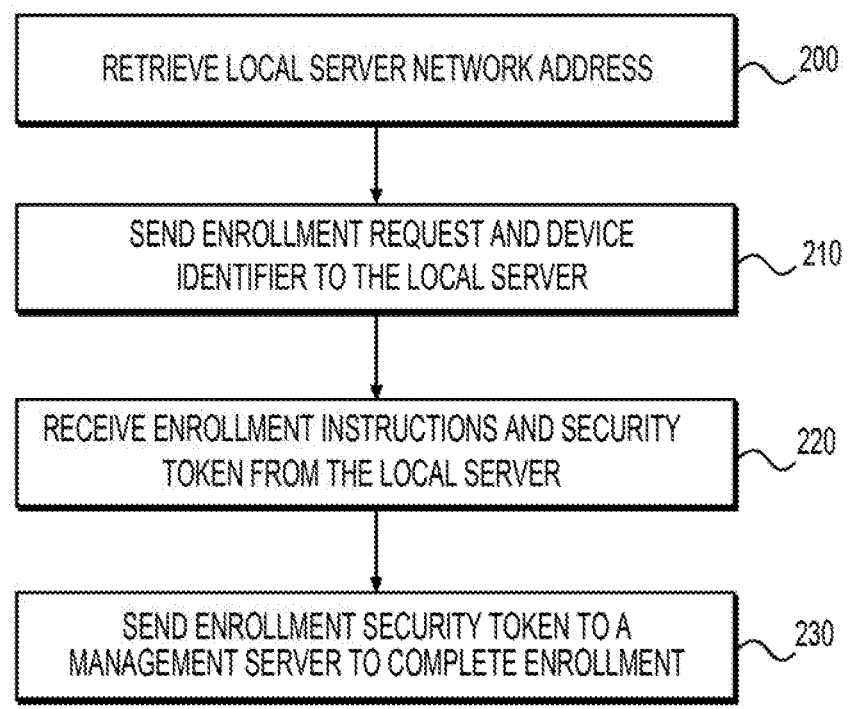
FIG. 2 is a flowchart of an example method for contextually providing automated device enrollment with a management system.

FIG. 2 is a flowchart of an example method for performing contextualized dynamic onboarding. In an example, the example method described below can be executed by the management application 140. At stage 200, the user device 100 can receive the network address of the local server 110. The network address can be an Internet Protocol ("IP") address or Uniform Resource Locator ("URL"), as a few examples. In some examples, the user device 100 can be preconfigured with the local server's 110 network address. For example, as part of a staging process, an administrator can install the management application 140 on the user device 100. The administrator can then program the local server 110 network address and configure the management application 140 to connect to the local server 110 using that address when the user device 100 next boots up.

In some examples, an organization can assign the same network address to all local servers. This may allow for a faster onboarding process and limit delays from an incorrect local server address being programmed into the user device 100. As an example, the local servers 110, 112, and 114 can all be located at different locations and on different local networks. However, within their respective local network, each of the local servers 110, 112, and 114 can have the same network address. In an example, the local networks 130, 132, and 134 can broadcast a wireless signal with the same name and password so that a user device can be easily programmed to connect to a local network when booting up. When a user receives a user device and boots it up, the management application 140 can initialize and automatically search for and connect to the local network, such as local network 130. After connecting to the local network, the user device 100 can search for and connect to the local server on the local network.

In some examples, the user device 100 may not be preconfigured with the local server's 110 network address, or the preconfigured address may be incorrect. In these examples, the user device can receive the network address through other means. In one example, the management application 140 can prompt a user to select a method for locating the local server 110. One example method can be a Quick Response ("QR") code scan. A QR code can be kept on site that has the local server network address embedded inside. Upon scanning the QR code, the user device 100 can receive the network address and proceed to contact the local server 110. Another example method can be a Near Field Communications ("NFC") bump. For example, by selecting an NFC bump method, the user device 100 can prepare itself to receive an NFC communication from another device. The user can position the user device 100 next to another device, such as another user device or another type of device with NFC capabilities that can transfer the local server address to the user device 100. Other methods of receiving the local server network address are contemplated within the scope of the invention, such as through manual input; however, non-manual methods may be preferred to limit the need for user interaction.

At stage 210, the user device 100 can send an enrollment request and a device identifier ("device ID") to the local server. The enrollment request can be a request to enroll the user device 100 in a UEMS, as an example. The device ID can be, for example, a set of unique alphanumeric characters that identifies a user device. Some examples of a device ID can include a serial number or International Mobile Equipment Identity ("IMEI") number.

In some examples, the device ID can be associated with an account or profile in a UEMS. As an example, during a staging process, an administrator can associate the device ID with a particular account in a UEMS. The user device 100 can then be sent to the user. Once the user device 100 sends the device ID to the local server 110, the device ID can be used to retrieve a security token for the associated account. As an example, the local server 110 can forward the enrollment request and device ID to the management server 120. The management server 120 can use the device ID to retrieve a security token for the associated account. The management server 120 can then send the security token to the local server 110. The security token can be sent as one or more data files, such as XML or JSON files, for example. Some examples of a security token can include a username and password, a one-time enrollment PIN, and an authentication token.

At stage 220, the user device 100 can receive enrollment instructions from the local server 110. The enrollment instructions can include the information necessary for the user device 100 to complete enrollment with the UEMS. For example, the enrollment instructions can include a network address of the management server 120. The enrollment instructions can also include a security token for auto enrolling the user device 100. In an example, the security token can be sent to the user device 100 using a type of secure transmission. For example, the security token can be encrypted or sent as a hash or cryptographic hash.

At stage 240, the user device 100 can enroll with the UEMS using an enrollment security token included in the enrollment instructions. For example, the user device 100 can connect to the management server 120 using a network address provided in the enrollment instructions. The user device 100 can then send the security token to the management server 120. In an example, the management server 120 can verify the security token and complete enrollment of the user device 100. The user device 100 can also send the security token using secured methods such as encryption or a hash.

The method described above can occur with minimal user interaction. Where the user device 100 is properly preconfigured during staging, the user device 100 can enroll without any user interaction except to power on the user device 100. In instances where the user device 100 is not preconfigured to connect to the local server 110, a user may be required to only follow a few prompts to select a method of locate the network address and then perform a simple action like scanning a QR code or placing the user device 100 near another device. In either case, the user device 100 should be able to enroll with a UEMS without requiring a user to input any credentials manually.

Figure 3:
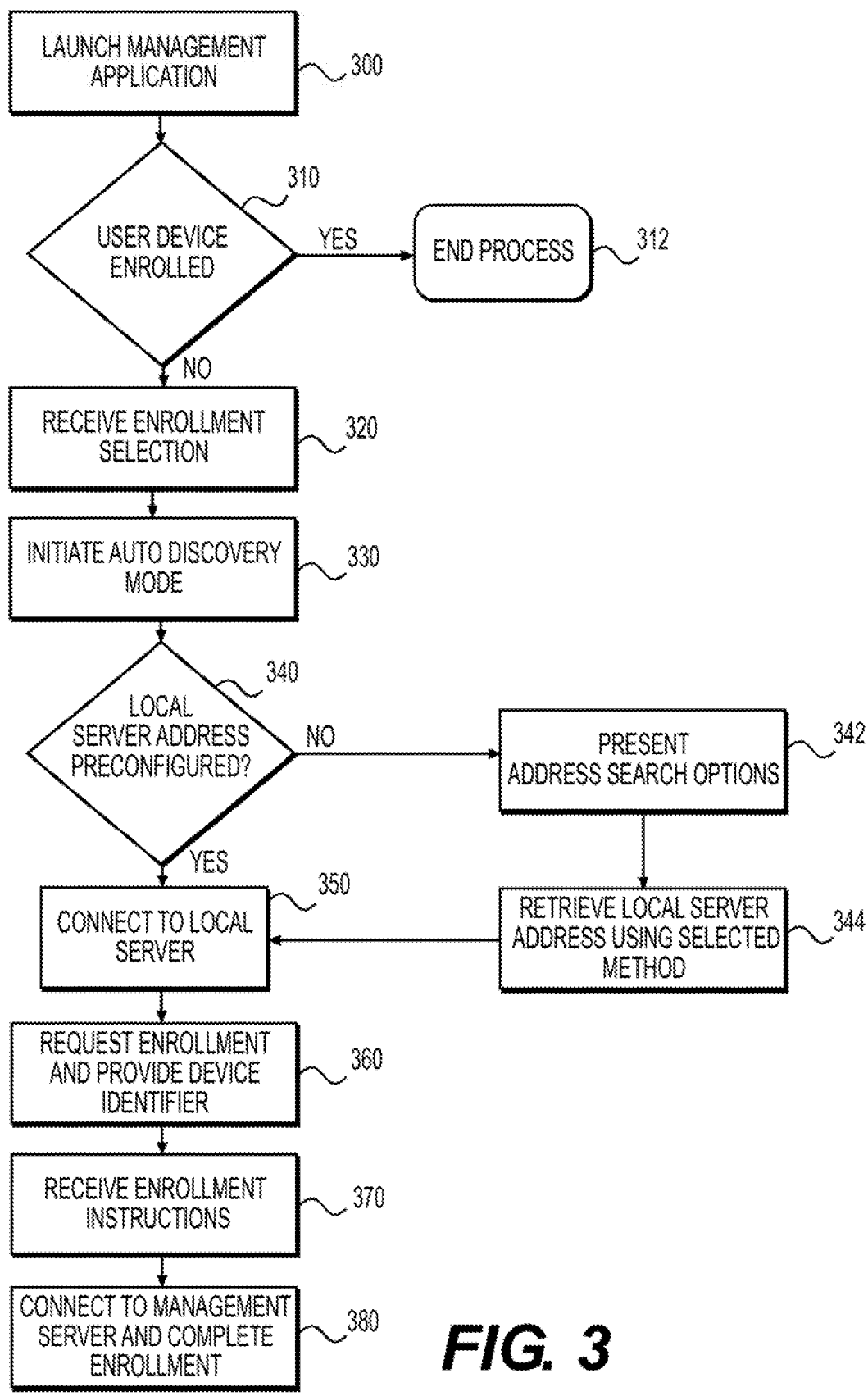
FIG. 3 is a flowchart of an example method of a management application contextually providing automated device enrollment with a management system.

FIG. 3 is a flowchart of an example method of the management application 140 performing contextualized dynamic onboarding. At stage 300, the management application 140 can launch on the user device 100. The management application 140 can be launched automatically when the user device 100 boots in some examples. In other examples, the launch can be user initiated. At stage 310, the management application 140 can check to see if the user device 100 is enrolled with a UEMS. If the user device 100 is already enrolled, the management application 140 can end the enrollment process at stage 312.

At stage 320, if the user device 100 is not enrolled, the management application 140 can receive an enrollment selection. The enrollment selection can indicate a request to enroll the user device 100 with the UEMS. In one example, the management application 140 can prompt a user in a user interface to enroll the user device 100. In another example, the management application 140 can be preconfigured to automatically initiate the enrollment process.

At stage 330, the management application 140 can initiate an auto discovery mode. In an example, the auto discovery mode can be a set of processes that the management application 140 executes to find and connect to the local server 110. Examples of such processes can include connecting to the local network 130 and connecting to the local server 110. In one example, the management application 140 can be preconfigured with the information needed to connect to local network 130, such as a WIFI Service Set Identifier ("SSID") and password. This can further reduce the amount of required user interaction. As an example, an enterprise organization can use the same WIFI SSID and password for all locations, such as local offices or stores. In this example, the management application 140 can be readily connect to the local network of any enterprise location without the need for user interaction. In other examples, each location may not have the same local network login information. In such examples, an administrator can preconfigure the management application 140 to connect to the local network at the location where the user device 100 is to be sent and enrolled. The management application 140 can also allow for manual configuration by the user to connect to the local network. This can be used in a backup method in case the preconfigured settings are unsuccessful, as an example.

At stage 340, the management application 140 can check to see if it is preconfigured with the address of the local server 110. Like the local network connection process described above at stage 330, multiple locations of an enterprise organization can use the same local server address so that user devices of the enterprise can be easily configured to connect to the local server regardless of location. As an example, any local server can be accessed by user devices connected to the same local network with the same URL.

In an instance where the management application 140 does not have the local server address or if the preconfigured address does not work, at stage 342 the management application 140 can prompt a user with options in a GUI to select a method to locate the local server address, such as by a QR code scan or an NFC bump, as some examples. The management application 140 can also present an option to have the user input the address manually. At stage 344, the management application 140 can retrieve the local server address using the selected method.

At stage 350, the management application 140 can instruct the user device 100 to connect to the local server 110 using the local server address. In one example, the local server address can be in the form of a URL. In another example, the user device 100 can connect to the local server 110 by sending a secure transfer request. After, or as part of, connecting to the local server 110, at stage 360, the management application 140 can instruct the user device 100 to send an enrollment request to the local server 110. In an example, the enrollment request can include a device ID, such as a serial number or IMEI number of the user device 100. The enrollment request can be sent as one or data files, such as XML or JSON files, for example.

In some examples, the device ID can be associated with an account or profile in a UEMS. As an example, during a staging process, an administrator can associate the device ID with a particular account in a UEMS. The user device 100 can then be sent to the user. Once the user device 100 sends the device ID to the local server 110, the device ID can be used to retrieve a security token for auto enrollment. As an example, the local server 110 can send forward the enrollment request and device ID to the management server 120. The management server 120 can use the device ID to retrieve the security token for the associated account. The management server 120 can then send the security token to the local server 110.

At stage 370, the user device 100 can receive enrollment instructions from the local server 110. The enrollment instructions can include the information needed for the user device 100 to complete enrollment with the UEMS. For example, the enrollment instructions can include a network address for the management server 120 and a security token. The security token can be linked to a specific account in the UEMS. Some examples of security tokens can include a username and password, a one-time enrollment PIN, an authentication token, and a hash.

At stage 380, the management application can instruct the user device 100 to connect to the management server 120 to complete enrollment. This can include, for example, establishing a network connection with the management server 120 using the received enrollment instructions, and sending the security token to the management server 120. In an example, once the user device 100 is successfully enrolled, the management application 140 can access the UEMS.

In an example of the method described above, an administrator can preconfigure the user device 100. This can include installing the management application 140 on the user device 100 and associating the user device 100 with an account in a UEMS using a device ID of the user device 100. In an example, after installing the management application 140, the administrator can log in using an administrator account that gives elevated permissions for configuring the management application 140. The administrator can configure the management application 140 to instruct the user device 100 to automatically begin the enrollment process the next time the management application 140 launches. This can include configuring the management application 140 with settings for connecting to the local network 130 and the local server 110. The administrator can then power down the user device 100 can send it the location of the local server 110. In some examples, the administrator can configure the device at the same location of the local server 110.

A user at the local server 110 location can receive and boot up the user device 100. In some examples, this can be the only interaction required by a user. For example, once the user device 100 is powered up, it can automatically launch the management application 140. The management application 140 can cause the user device 100 to connect to the local network 130 and the local server 110 using the preconfigured network settings. Once connected, the management application 140 can cause the user device 100 to send an enrollment request and device ID to the local server 110. The local server 120 can forward the request and device ID to the management server 120. The management server 120 can verify the enrollment request, retrieve a security token for the account associated with the device ID, and send the security token to the local server 110. The local server 110 can then send the security token and network address for the management server 120 to the user device 100. The user device 100 can then connect to the management server 120 and complete enrollment using the security token. In this example, the only interaction required by a user is to power on the user device 100. Additional user interaction may only be required where a failure in the process occurs, such as where the user device cannot automatically connect to the local network 130 or the local server 110.

Figure 4:
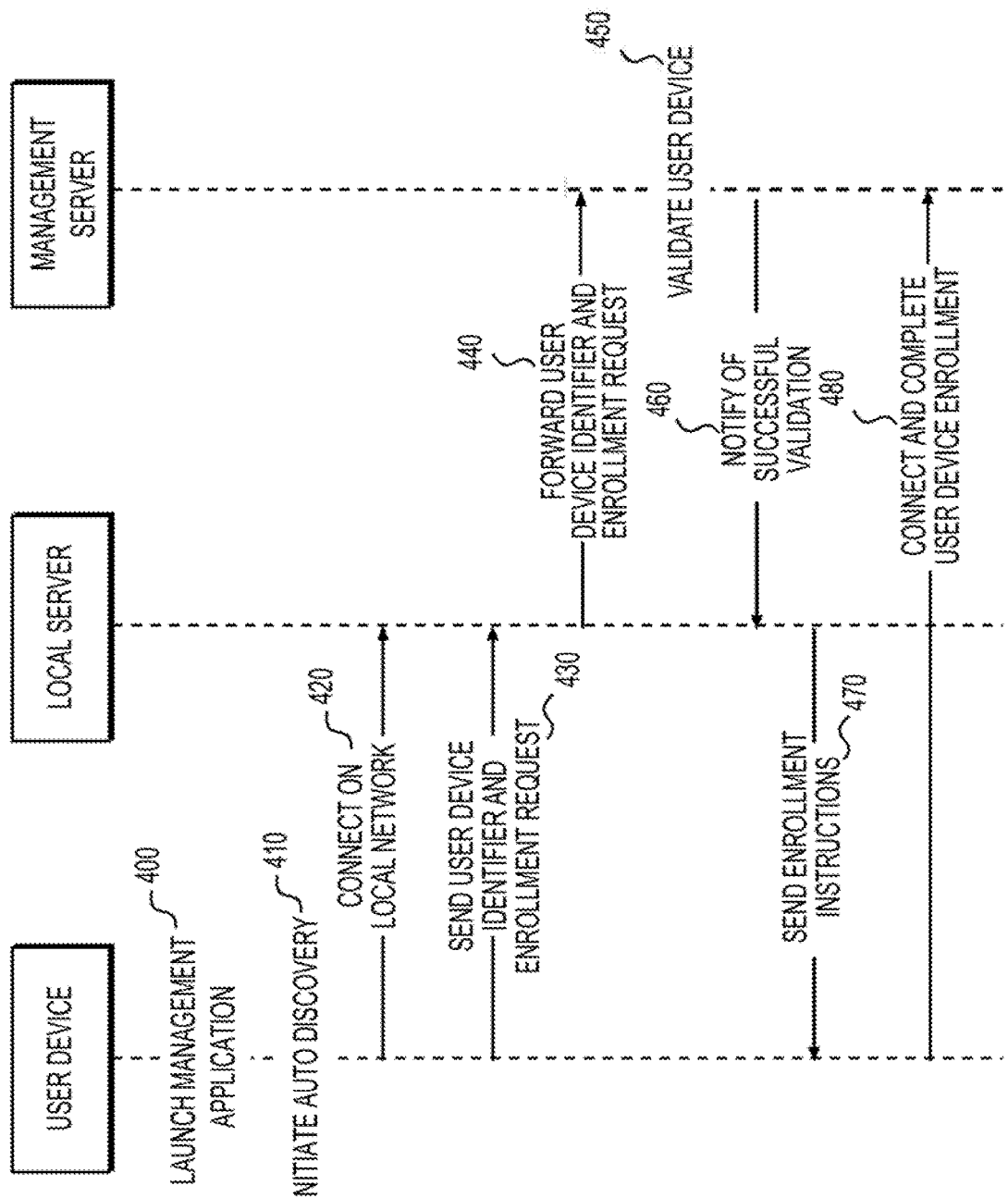
FIG. 4 is a sequence diagram of an example method for contextually providing automated device enrollment with a management system.

FIG. 4 is a sequence diagram of an example method for performing contextualized dynamic onboarding. The sequence diagram includes the user device 100, the local server 110, and the management server 120. At stage 400, the user device 100 can launch the management application 140. In one example, the user device 100 can be configured to automatically launch the management application 140 when it boots. If not, in another example a user can launch the management application 140.

At stage 410, the management application 140 initiates auto discovery mode. In one example, the management application 140 can be configured to automatically initiate auto discovery mode. Alternatively, a user can initiate the auto discovery mode in the management application 140. In an example, in auto discovery mode the management application 140 can cause the user device 100 to attempt to connect to the local server 110. For example, the management application 140 can be preconfigured with the network settings for the local network 130 and the network address of the local server 110. In an instance where the network settings are not available or incorrect, the management application 140 can prompt the user to select a method to provide the network settings. For example, the management application 140 can provide a list of options in a GUI that a user can select from to provide the network address. Some examples can include a QR code scan, an NFC bump, and manual input.

At stage 420, the user device 100 can connect to the local server 110. For example, the user device 100 can connect to the local network 130 and then, using the network address of the local server 110, it can send a connection request to the local server 110. Once the connection has been established, at stage 430, the user device 100 can send an enrollment request and device ID to the local server 110. The request and device ID can be sent as one or more data files, such as a JSON or XML file.

At stage 440, the local server 110 can forward the enrollment request and device ID to the management server. In an example, the local server 110 can also send additional information as may be required for enrolling the user device 100. For example, the UEMS may utilize group IDs to identify an organizational group that devices belong to. The group ID associated with a device can affect the enterprise applications, files, and other resources that the device can access. For example, administrative users can belong to a group with elevated access rights, whereas users at the location of the local server 110 can be limited to resources associated with that location. In one example, the group ID can be preconfigured into the management application 140 or the UEMS by an administrator during a staging process. In another example, the local server 110 can store the group ID and send it to the management server 120 along with the enrollment request and device ID.

If the group ID does not exist at the management server, the management server can create a new group that corresponds with the group ID. Going forward, devices enrolling with the group ID can be associated with that group at the management server. This can cut down on administrative tasks that may otherwise be needed to create new groups and ensure enrollment of devices goes forward even when the group was not yet created.

At stage 450, the management server 120 can validate the enrollment request. Validating the enrollment request can include verifying that the user device 100 is authorized to enroll with the UEMS. In an example, the management server 120 can also verify that the user device 100 is authorized to enroll without a user inputting credentials. In an example, an administrator can authorize the user device 100 during a staging process. For example, an administrator can enter the device ID of the user device 100 into the UEMS during staging. The UEMS can save the device ID in a table of user devices authorized to enroll without manually inputted user credentials. The management server 120 can then check the table to make sure the device ID is there.

In some examples, the management server 120 can also look up credentials of an account associated with the user device 100. As an example, the management server 120 can access a table that includes device IDs and credentials for accounts. In one example, the management server 120 can retrieve the credentials and send them to the local server 110 at stage 460. Alternatively, after validating the user device 100, the management server 120 can generate a one-time security token for the user device 100 to use to auto enroll. For example, the management server 120 can generate an encrypted security token that can only be used for enrollment purposes. The management server 120 can also encrypt the security token before sending to the local server 110. In an example, the management server 120 can send the security token as a hash.

In some examples, the local server 100 can provide the security token instead of the management server 120. This can occur at stage 470 where the local server 110 configures the enrollment instructions. The enrollment instructions can include, for example, network settings for connecting to the management server 120 and a security token for authenticating with the management server 120. The network settings can include, for example, a URL for the management server 120.

As explained above, in some examples the local server 110 can provide the security token. In one example, the security token can be associated with the location from where the user device 100 is enrolling. As an example, the local server 110 can provide the same security token to all devices validated for enrollment, whereas the local server 112 can use a different security token for all user devices validated for enrollment. In these examples, the security token can include a group ID associated with the local server 110 or its location. This can help ensure that all user devices enrolling at a location receive access rights to the same resources and data in the UEMS.

In some examples, the local server 110 can send an enrollment template that the management application 140 can use to configure enrollment credentials. For example, the template can have placeholders that instruct the management application 140 on what information is to be used in the enrollment credentials. In an example, the information needed to replace the placeholder can be information stored within the user device 110 that is available to the management application 140. For example, the placeholders can request information related to the user device 100, such as the model, manufacturer, or device ID. The script below is an example of enrollment instructions with placeholders.

```
{
    serverurl: "https://uem.server.com",
    gid: "XYZ_Store_DC",
    un: "XYZ_Store_%MODEL%",
    pw: "XYZ_Store_%DEVICEID%"
}
```

In the script above, the "serverurl" entry can provide the network address, in this case a URL, for the management server 140. This field can be provided by the local server 110. The "gid" can provide the group ID for the user device 100. This field can also be provided by the local server 110. The "un" and "pw" entries can indicate a username and password the user device 100 should provide to the management server 120 to complete enrollment. In the example script above, the first portion of the username and password, "XYZ_Store_", can represent a portion of the password that must be included as is. The "% MODEL %" and "% DEVICEID %" can be placeholders, and they can be recognized as such by the "%" characters. In this example, the management application 140 can replace the "% MODEL %" placeholder with the model of the user device 100, such as "PIXEL," "GALAXY," or "IPHONE." The management application 140 can also replace the "% DEVICEID %" placeholder with the device ID of the user device 100, such as its IMEI number. The placeholders in the enrollment instructions can be set by an administrator, in an example.

At stage 480, the local server 110 can send the enrollment instructions to the user device 100. In an example, the management application 140 can retrieve the enrollment instructions can configure the security token, if necessary. For example, in the example described above where the local server 110 provides an enrollment template with placeholders, the management application 140 can format the credentials by replacing the placeholders with the requested information. In some examples, the enrollment instructions may be encrypted, and the management application 140 can unencrypt them with a key.

At stage 490, the user device 100 can connect to the management server 120 and complete enrollment. Completing enrollment can include providing the security token or credentials to the management server 120. Once the user device 100 is successful enrolled, the management application 120 can grant it access to UEMS resources and data.

In examples where the management server provides a security token, the management application 140 can unencrypt the security token using a key to access the information it needs to complete enrollment, and then it can encrypt the enrollment credentials, or in some examples an authentication token, using a security key. For security reasons, the UEMS can require that the user device 100 provide the security token to the management server 120 using a different encryption key than the key used to send the security token to the user device 100. Once enrollment is complete, the management application 140 can notify the user in a GUI on the user device 100.

The placeholder described above method can be particularly beneficial when a user must enroll numerous user devices at once. As an example, an administrator can pre-configure a large group of user devices and send them to the location of the local server 110, such as an office or store related to an enterprise. A user with configuration rights to the local server 110 can configure an enrollment template with placeholders. In an example, the placeholders can require the device ID be included in the credentials. Once the local server 110 is configured, a user can boot up the user devices, and the management application 140 on each user device can handle the enrollment process, including replacing the placeholders with the required information. The device ID, for example, can be used as a placeholder to uniquely identify and authenticate each user device. Other information that uniquely identifies the user device 100 can also be used, such as the model and serial numbers.

In some examples, the user device 100 may be associated with a user who does not yet have an account in the UEMS. In such examples, the management server 120 may require that the user device 100 provide credentials as part of the enrollment process. In such examples, an administrator can add the device ID to the UEMS so that the management server 120 can determine that the user device 100 is authorized to auto enroll without a username and password. The management server 120 can create a one-time security token that allows the user device 100 to enroll with the UEMS. After the user device 100 provides the one-time token to the management server 120, the management application 140 can prompt a user to enter a username and password for the user's account. The user device 100 can then send the entered credentials to the management server 120, which in turn can link to the user's account and store in a secured location.

The systems and methods described above require little to no user intervention during the onboarding process. This can allow large numbers of user devices to be seamlessly enrolled into a UEMS. For example, where many devices need to be enrolled at a location, an administrator can preconfigure the devices to auto enroll into the UEMS. The administrator can load the onboarding settings into a rapid provisioning method, such as a QR coded or NFC bump. The administrator can install the management application 140 and use the rapid provisioning method to quickly preconfigure the devices. The user devices can then be sent to the location where they are to enroll. A user at the location may need to only power on the devices, and the management application 140 will run the auto enroll process to enroll the devices. If the network settings do not match and the user devices cannot locate the local server, the user may need only to use a local QR code or NFC bump to quickly load the correct network settings into the management application 140 so that the devices can complete the enrollment process.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for onboarding user devices in a unified endpoint management system ("UEMS"), comprising:

receiving, at a management application of a user device, network settings for connecting to a local server;

providing, by the management application, an enrollment request and an identifier of the user device to the local server;

receiving, at the management application, enrollment instructions from the local server, the enrollment instructions including a network address of the management server, a security token provided to the local server by the management server, and an enrollment template, wherein the enrollment template includes an identifier associated with a location of the local server;

configuring enrollment credentials using the enrollment template; and enrolling the user device with a management server, including providing, by the management application, the security token and enrollment credentials to the management server, wherein enrolling the user device includes granting access to UEMS resources based on the enrollment credentials.

2. The method of claim 1, wherein the network settings are received based on the user device scanning a QR code with a network address of the local server.

3. The method of claim 1, wherein the security token and enrollment credentials are provided to the management server using the network address.

4. The method of claim 1, wherein the enrollment instructions further include placeholders, and enrolling with the management server further comprises:

replacing the placeholders with information relating to the model of the user device; and providing the device model information to the management server.

5. The method of claim 1, wherein the user device identifier is associated with an account in the UEMS and is used to validate the user device.

6. The method of claim 1, wherein the security token received at the management application is different from the security token provided to the management server for enrollment, and the two security tokens use different security keys.

7. The method of claim 1, wherein the enrollment instructions include a group identifier, and wherein enrolling the user device includes supplying the group identifier to the management server, wherein the management server creates a new group based on the group identifier and associates the user device with the new group.

8. A non-transitory, computer-readable medium containing instructions that, when executed by a hardware-based processor, performs stages for onboarding user devices in a unified endpoint management system ("UEMS"), the stages comprising:

receiving network settings that allow a user device to locate a local server;

providing an enrollment request and an identifier of the user device to the local server;

receiving, at the management application, enrollment instructions from the local server, the enrollment instructions including a network address of the management server, a security token provided to the local server by the management server, and an enrollment template, wherein the enrollment template includes an identifier associated with a location of the local server;

configuring enrollment credentials using the enrollment template; and enrolling the user device with a management server, including providing, by the management application, the security token and enrollment credentials to the management server, wherein enrolling the user device includes granting access to UEMS resources based on the enrollment credentials.

9. The non-transitory, computer-readable medium of claim 8, wherein the network settings are received based on the user device scanning a QR code with a network address of the local server.

10. The non-transitory, computer-readable medium of claim 8, wherein security token and enrollment credentials are provided to the management server using the network address.

11. The non-transitory, computer-readable medium of claim 8, wherein the enrollment instructions further include placeholders, and enrolling with the management server further comprises:
   replacing the placeholders with information relating to the model of the user device; and
   providing the device model information to the management server.

12. The non-transitory, computer-readable medium of claim 8, wherein the user device identifier is associated with an account in the UEMS and is used to validate the user device.

13. The non-transitory, computer-readable medium of claim 8, wherein the security token received at the management application is different from the security token provided to the management server for enrollment, and the two security tokens use different security keys.

14. The non-transitory, computer-readable medium of claim 8, wherein the enrollment instructions include a group identifier, and wherein enrolling the user device includes supplying the group identifier to the management server, wherein the management server creates a new group based on the group identifier and associates the user device with the new group.

15. A system for onboarding user devices in a unified endpoint management system ("UEMS"), comprising:
   a memory storage including a non-transitory, computer-readable medium comprising instructions; and
   a computing device including a hardware-based processor that executes the instructions to carry out stages comprising:
      receiving network settings that allow a user device to locate a local server;
      providing an enrollment request and an identifier of the user device to the local server;
      receiving, at the management application, enrollment instructions from the local server, the enrollment instructions including a network address of the management server, a security token provided to the local server by the management server, and an enrollment template, wherein the enrollment template includes an identifier associated with a location of the local server;
      configuring enrollment credentials using the enrollment template; and
      enrolling the user device with a management server, including providing, by the management application, the security token and enrollment credentials to the management server, wherein enrolling the user device includes granting access to UEMS resources based on the enrollment credentials.

16. The system of claim 15, wherein the network settings are received based on the user device scanning a QR code with a network address of the local server.

17. The system of claim 15, wherein the security token and enrollment credentials are provided to the management server using the network address.

18. The system of claim 15, wherein the enrollment instructions further include placeholders, and enrolling with the management server further comprises:
   replacing the placeholders with information relating to the model of the user device; and
   providing the device model information to the management server.

19. The system of claim 15, wherein the user device identifier is associated with an account in the UEMS and is used to validate the user device.

20. The system of claim 15, wherein the security token received at the management application is different from the security token provided to the management server for enrollment, and the two security tokens use different security keys.

* * * * *